(No Model.) 6 Sheets—Sheet 1.
T. DUNCAN.
ELECTRIC METER.

No. 523,704. Patented July 31, 1894.

WITNESSES:
A. L. King
H. R. Wolfe

Thomas Duncan INVENTOR
BY Chapin & Denny
his ATTORNEYS.

(No Model.)

6 Sheets—Sheet 2.

T. DUNCAN.
ELECTRIC METER.

No. 523,704.

Patented July 31, 1894.

WITNESSES:
A. L. King
H. R. Wolfe

Thomas Duncan INVENTOR

BY Chapin & Denny
his ATTORNEYS.

(No Model.)  
6 Sheets—Sheet 3.

T. DUNCAN.
ELECTRIC METER.

No. 523,704. Patented July 31, 1894.

WITNESSES:  
A. L. King  
H. R. Wolfe

Thomas Duncan INVENTOR  
BY Chapin & Denny  
his ATTORNEYS (No Model.)  6 Sheets—Sheet 4.

T. DUNCAN.
ELECTRIC METER.

No. 523,704.  Patented July 31, 1894.

WITNESSES:  INVENTOR
A. L. King  Thomas Duncan
H. R. Wolfe  BY Chapin & Denny
  his ATTORNEYS.

(No Model.) 6 Sheets—Sheet 5.
T. DUNCAN.
ELECTRIC METER.
No. 523,704. Patented July 31, 1894.
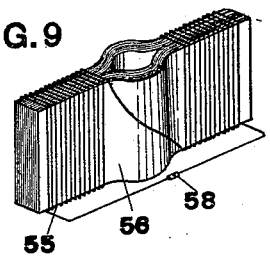
FIG. 9
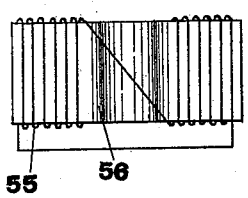
FIG. 10
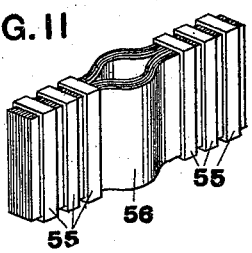
FIG. 11
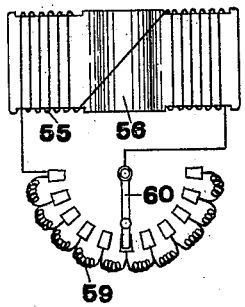
FIG. 12 / FIG. 13
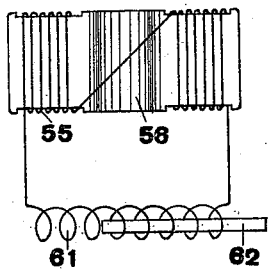
FIG. 14
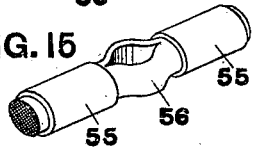
FIG. 15
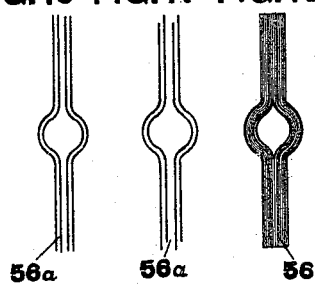
FIG. 16  FIG. 17  FIG. 18  FIG. 19  FIG. 20  FIG. 21
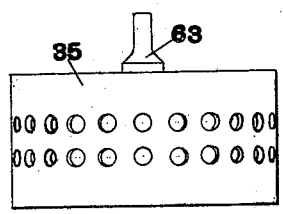
FIG. 22
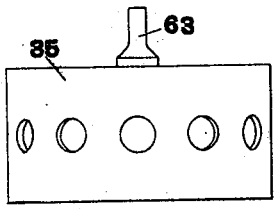
FIG. 23
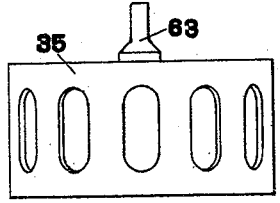
FIG. 24
WITNESSES:
A. L. King
H. R. Wolfe
Thomas Duncan INVENTOR:
BY Chapin & Denny
his ATTORNEYS.

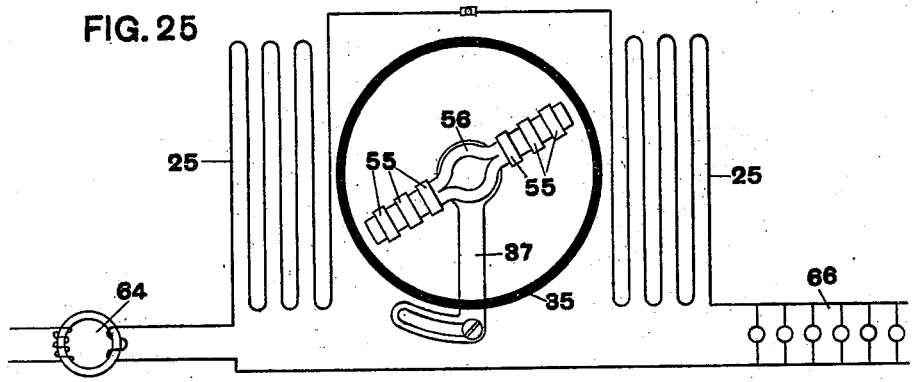
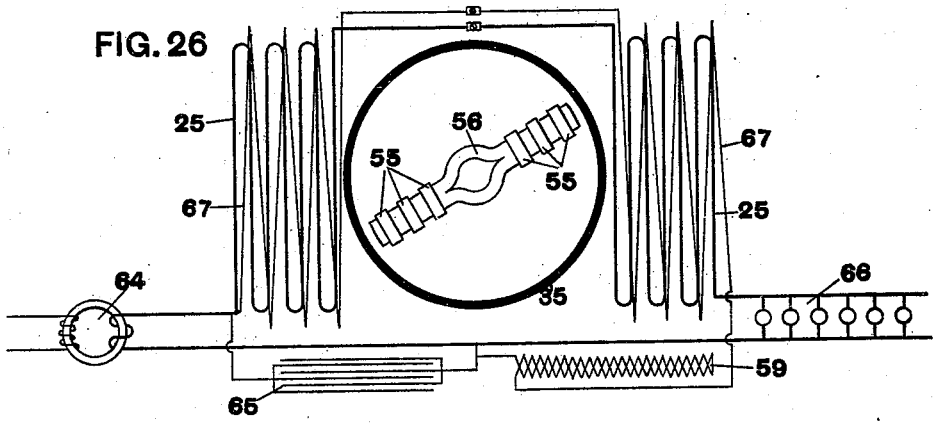
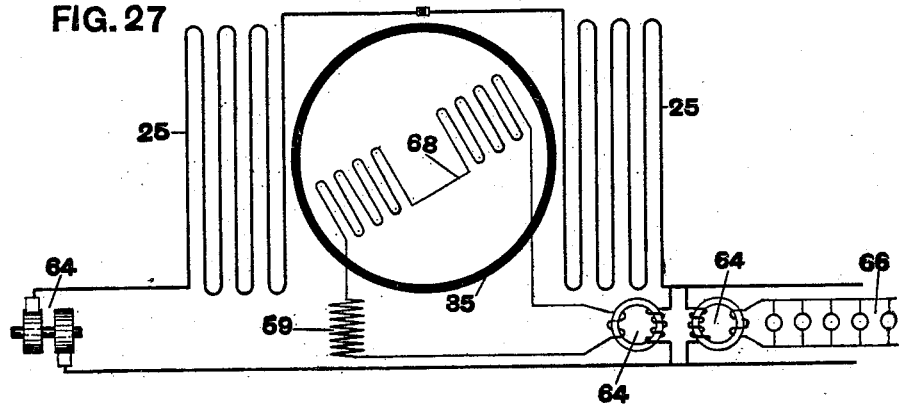

UNITED STATES PATENT OFFICE.

THOMAS DUNCAN, OF FORT WAYNE, INDIANA.

ELECTRIC METER.

SPECIFICATION forming part of Letters Patent No. 523,704, dated July 31, 1894.

Application filed March 14, 1894. Serial No. 503,534. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

In certain patents issued to me March 23, 1893, No. 6,241, in Great Britain; June 17, 1893, No. 230,935, in France; August 16, 1893, No. 43,934, in Canada; July 4, No. 500,868 and No. 501,000, in the United States, also applications filed December 21, 1891, Serial No. 415,825, and May 22, 1893, Serial No. 475,089, and in Germany June 20, 1893, Serial No. D. 5,823, I have described an apparatus for and a method of measuring single and multiphase electric currents.

The present invention relates to certain improvements in the method of measuring, and in the apparatus described in said patents and applications, which will be described in connection with the accompanying drawings.

Figure 1:
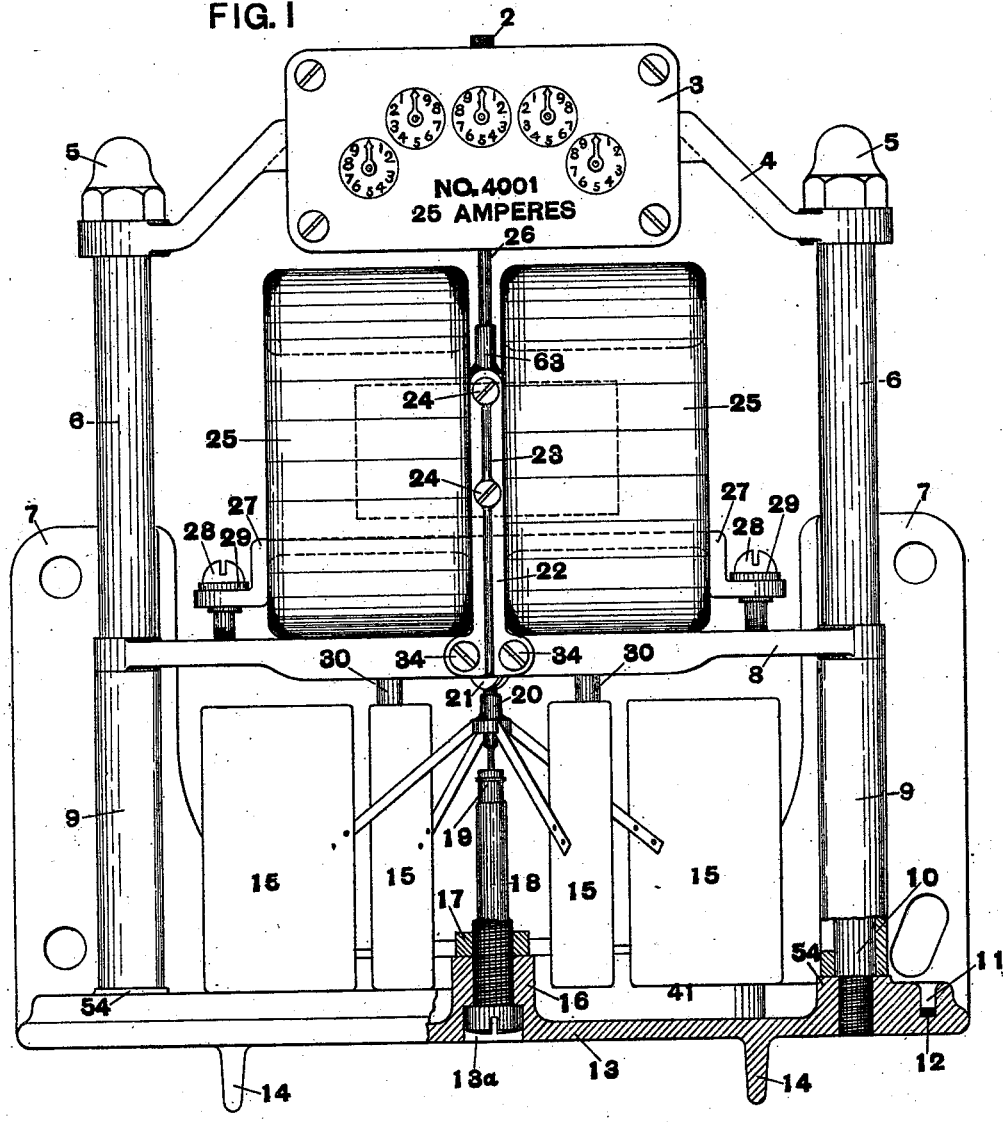
Figure 2:
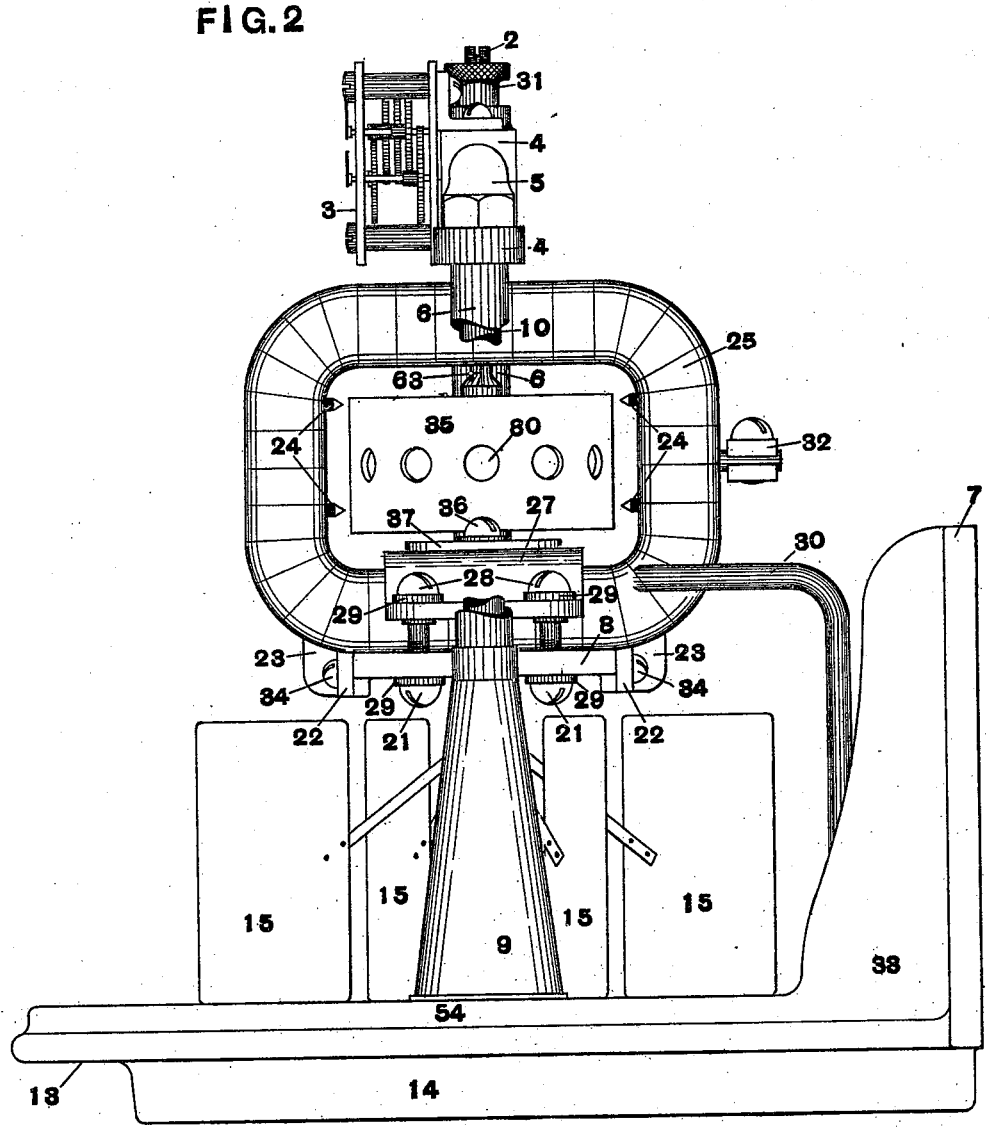
Figure 3:
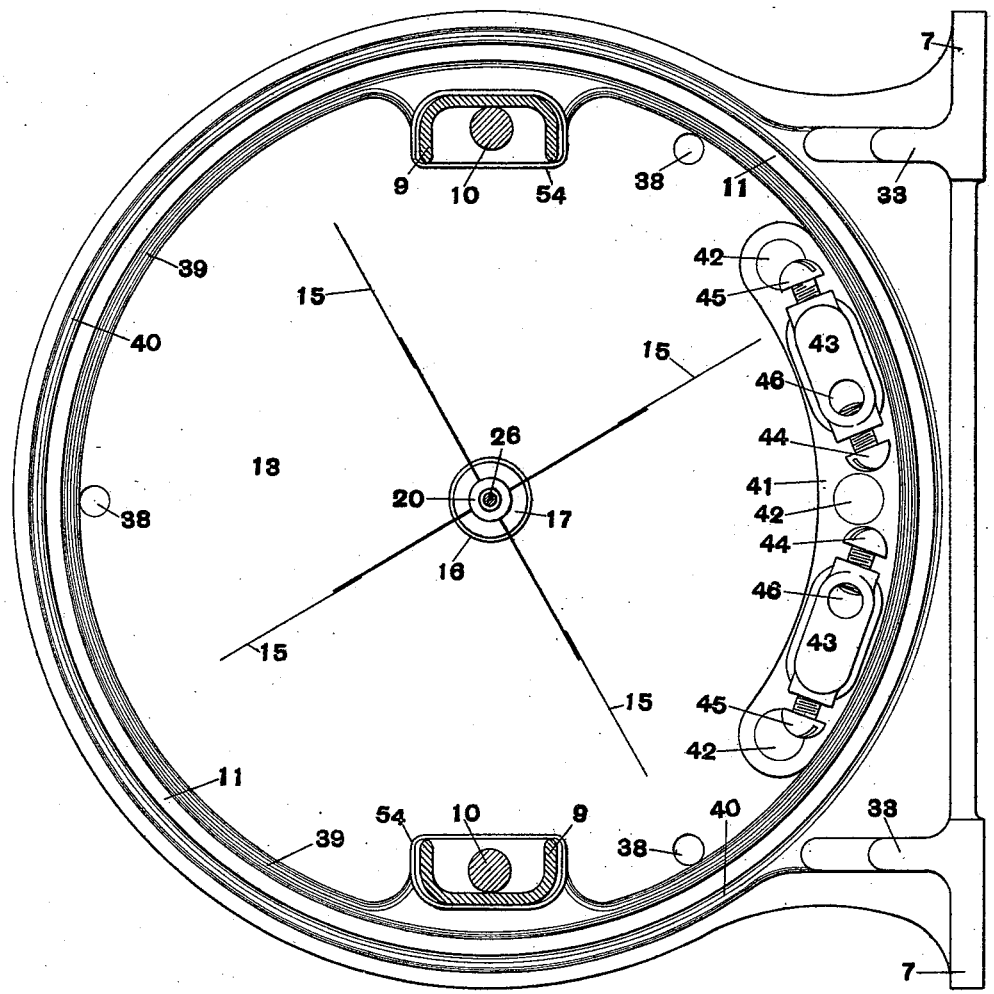
Figure 4:
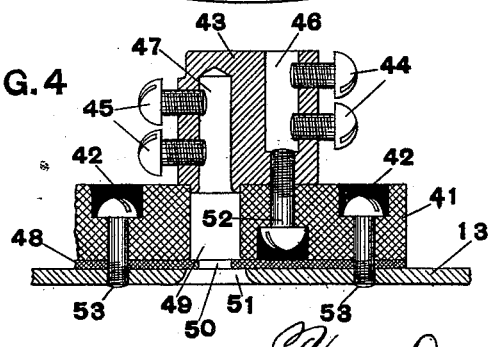
Figure 5:
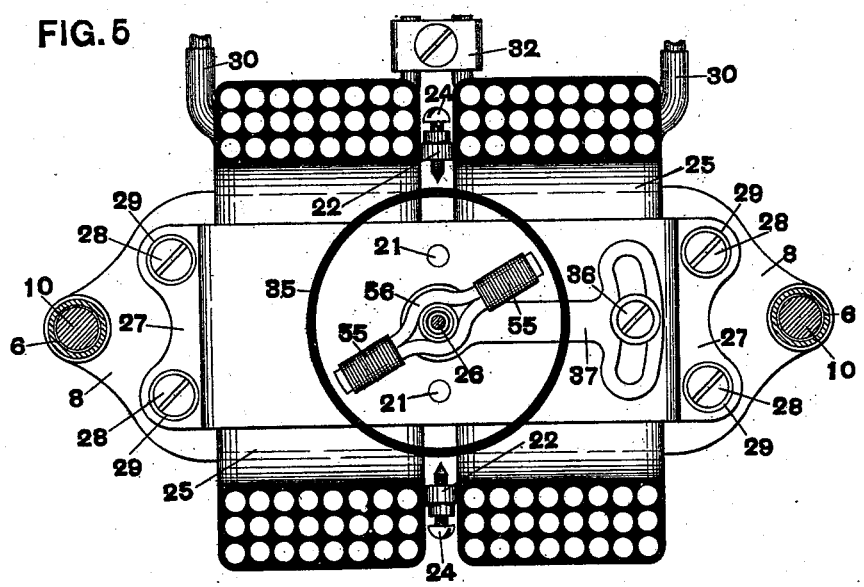
Figure 6:
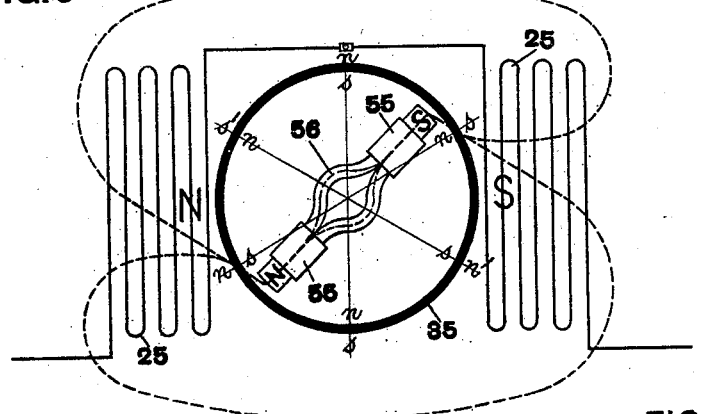
Figures 7, 8:
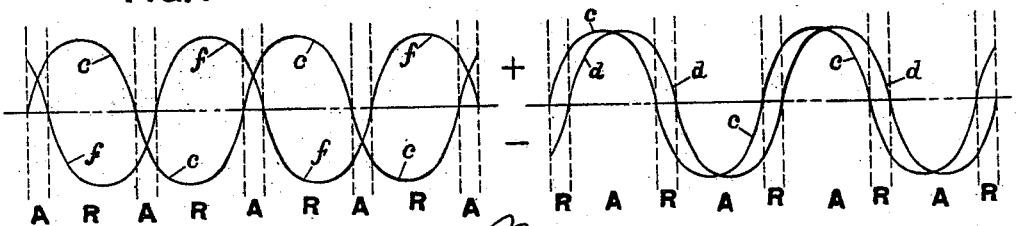

Figure 1 is a front elevation of my improved meter. Fig. 2 is a side elevation of the same having part of its standard removed at one place to show the details of the armature. Fig. 3 is a plan view of the base, fans and binding posts together with the supporting standards in section. Fig. 4 is an elevation in section of the dust proof binding posts shown in Fig. 3. Fig. 5 is a plan view in section of the energizing field coils, armature, and diverter, and also the method of adjusting the speed, and securing the armature in transit. Fig. 6 shows a diagrammatic view of the method, as herein described for producing rotation of the armature with an increased efficiency and as shown by the tables hereinafter given. Fig. 7 shows the relative position of the currents in the energizing field coils and the armature respectively for producing rotation. Fig. 8 also shows the relative position occupied by the induced currents in the armature and the closed diverter coils respectively. Figs. 9, 10, 11, 12, 13, 14 and 15 show various methods of constructing my improved diverter. Figs. 16, 17, 18, 19 and 20 are details of the sheet iron or steel core of the diverter. Figs. 21, 22, 23 and 24 show a few of the different ways in which the armature may be made. Figs. 25, 26 and 27 are diagrammatic views of the various methods of connecting the meter in circuit.

In the drawings similar numbers indicate corresponding parts throughout the several views.

In Figs. 1 and 2 is shown the field coils 25 connected in the circuit carrying the current to be measured and having their outer terminals secured to the dust proof binding posts 43, seen in Fig. 3. The inside terminals of these field coils are coupled together with a screw connection 32, Figs. 2 and 5. These field coils are shown in series but are coupled in multiple when the capacity of the meter is doubled. To insure these coils against abrasion and for the purpose of preventing their making contact or grounding with any other part of the meter, they are wound with insulating tape, as shown. These are supported upon the cross bar 8 and clamped thereto with the clamping plate 27, being screwed firmly in position at the ends, by means of the screws 28, and is insulated therefrom by means of the hard rubber bushings 29, thus preventing all possibility of forming a closed circuit in the vicinity of the energizing coils. The said clamping plate 27 is also secured to the cross bar 8 at its center with the screws 21 provided with the insulating bushings 29. The cast arms 22 with ribs 23 are also secured to the cross bar 8 and set between the two field coils 25, thereby serving to keep them in position during transit. Their main function however is to hold the armature firmly and securely in position when the meter is not in use. To accomplish this the said arms are each provided with two set screws 24 having a fine point as shown in Figs. 2 and 5. The armature 35 has small perforations drilled in it, but not shown in the drawings, counter-sunk and adapted to engage with the points of the said set screws, thereby insuring a firm grip on the same. These counter-sinkings are about one thirty-second of an inch lower than the engaging screws, so that the cylinder is raised up out of the jeweled bearing 19 when the said screws are engaged with the said cylinder. This armature or cylinder is mounted upon the shaft or spindle 26 to which is also screwed the aluminum retarding fans 15 and the worm gear which drives the registering train 3, but not shown in the drawings. The upper end of this spindle 26 is held in position by the bearing 2 which is itself adjusted in the top bar 4 with the check nut 31. The lower end rests upon the jeweled bearing 18 and 19, 18 representing the jewel post proper, while 19 represents the cap covering the same to prevent the entrance of dust or other substances calculated to impair its motion by increased friction. The boss 16 upon the base 13 is adapted to admit of screwing the said jewel post 18 in or out as the case may be without having to remove or take apart other parts of the meter. This is an important convenience to all users of electric meters, since all forms now in use have to be taken apart in numerous places when it is desired to insert a new jewel or to remove the old one for the purpose of cleaning or oiling the same.

With my improvement all that is necessary is to simply unscrew the check nut 17, remove the post 18 in a well known manner, when it can be readily cleaned and replaced without even removing the meter from its position upon the wall or elsewhere.

The space 13$^a$ is filled with wax or other suitable material to prevent its being tampered with by intruders. The ribs 14 cast upon the said base are designed and adapted to strengthen it and also to be used as feet for the said meter. The bosses 54 also cast upon the said base are designed to hold the standard posts 10 which hold the cross bar 8 with their respective supports 9 and 6. The cast support 9 is shown in plan in Fig. 3, 6 being a tube slipped down over 10 and resting upon 8, the whole being screwed down firmly with the cap nuts 5. An extension of the boss 54 is also shown having a groove cast therein and shown at 11. This is for the cover of the meter to fit into, which further rests upon the felt 12 or other suitable material laid at the bottom of said groove, thereby preventing the entrance of either dust or insects, and thus providing an effectual remedy for one of the most serious and annoying defects of the meters at present in use.

Fig. 3 shows the position of the fans and the dust proof binding posts 43. The three holes 38 are all shown, and through which offset screws riveted upon the inside of the cover pass, having thumb nuts screwed thereon upon the lower side of the base, which draw it down tightly upon the felt. Fig. 4 is an elevated section of these dust proof binding posts, which combined with the arrangement at 11 and 12 for the cover, make the entrance of moisture, dust, insects or corroding fumes practically impossible. This binding post is fastened to an insulating block 41, made from wood boiled in paraffine wax, porcelain, vulcanite, or fiber by the screw 52. and the shoulder which fits down into the space or entrance 49 prevents any lateral motion taking place. This is then screwed firmly upon the base 13 with the screws 53 having a sheet of rubber cloth 48 interposed, which further prevents the entrance of dust, &c. The spaces 42 sunk in the terminal block 41 and into which the screw heads fit, are filled with wax or other insulating material. The terminals of the field coil are inserted into the holes 46 and fastened with the two screws 44, while the line is inserted from the bottom through the spaces 51, 50, and 49, into 47 where the screws 45 hold it firmly in position. The space or hole 50 cut in the sheet rubber is made smaller in diameter than either 49 or 51, thereby fitting very closely around the insulation of the wire.

In Fig. 5 which is a plan view of the motive part of the apparatus, is shown the arrangement for varying the angle of the diverter 56. This is done by means of the lever arm 37 which is soldered to a tube, also holding the diverter in place. This tube is held in position by being slipped over another smaller tube which is rigidly secured to the clamping plate 27. The set screw 36 holds it firmly when the requisite speed has been obtained.

The diverter 56 is made from thin sheets of iron and pressed into the form shown, when it is riveted and slipped down over the outer tube to which the adjusting lever 37 is fixed. Part 55 represents punched copper washers which fit closely upon the two ends or poles of the diverter for increasing the rotative power or torque of the meter and which will be explained more fully in connection with Fig. 6. In placing the said washers upon the diverter care must be taken to have them insulated therefrom, consequently the diverter is wrapped with silk before placing them in position. I have also obtained excellent results by insulating each washer or punching by inserting a piece of tissue paper or other thin non-conducting material between them, or by using a small air gap.

In Fig. 6 which illustrates the principle of rotation, let us assume that during an impulse of current the magnetism resulting therefrom follows a path as indicated by the dotted lines and polarizes the left hand field coil 25 as shown having a north pole N toward or facing the armature. As this flux cuts through the armature in passing to the diverter placed within it, it develops a secondary current in the said armature which flows in the opposite direction to that of the current traversing the field coil 25, thereby repelling or blowing said armature away from it. The position of these inducing and induced poles are shown in the diagram where N has induced the secondary pole $n$ upon one side of the armature, while the other or right hand coil 25 is producing the same action only differing in polarity. During the former part of the instant when this action takes place the diverter poles have a polarity opposite to those of the field coils facing them, but as soon as the induced currents in the armature take place these induced poles tend to change the polarity of the diverter opposite to that which resulted by direct induction from the coils 25. By causing these diverter poles to reverse their magnetism by the action of the induced currents in the armature an attractive force will be set up between the pole of the diverter and the interior induced pole of the cylinder or armature, thereby creating another force to work in conjunction with the repelling force set up between the inducing field coils 25 and the interior induced poles of the cylinder produced thereby. This attraction does exist in the before mentioned patents and applications, but is so feeble and inefficient that it does not enter as a factor into the torque producing rotation, so that it was not mentioned in said patents, the repulsion alone being described therein.

In order that a strong attractive force may be developed between the poles of the diverter and the interior induced poles of the armature or cylinder 35, I have discovered a method of accomplishing this with excellent results as will be shown by the tables of comparison of speeds. It consists of winding upon the diverter, a coil closed upon itself, and forming a short circuit. When this is done an impulse of current traversing the field coils 25 will produce inducing and induced poles as shown. Repulsion will take place between the field coil pole N and the induced pole $n$ nearest to it, but N will also attract the induced pole $s'$, while S upon the other side will also repel the induced pole $s$ nearest to it and attract $n'$. But since a closed coil or seat of secondary currents has been wound upon the diverter, the said diverter will change its polarity on account of the currents developed within said closed circuit, and will have a sign opposite to that of the interior induced pole of the armature, thereby attracting it toward it, shown at N and $s$ and S and $n$ respectively.

Test without coil on diverter:

| Ampères. | Revolutions per minute. | Initial speed. |
|---|---|---|
| 1 | 3.00 | 3.00 |
| 5 | 30.00 | 6.00 |
| 10 | 60.00 | 6.00 |
| 15 | 90.00 | 6.00 |
| 20 | 120.00 | 6.00 |
| 25 | 150.00 | 6.00 |

Test with coil on diverter:

| Ampères. | Revolutions per minute. | Initial speed. |
|---|---|---|
| 1 | 10.00 | 10.00 |
| 5 | 60.00 | 12.00 |
| 10 | 120.00 | 12.00 |
| 15 | 180.00 | 12.00 |
| 20 | 240.00 | 12.00 |
| 25 | 300.00 | 12.00 |

The latter of these tables shows the enormous increase in the rotative power acting upon the shaft which is exactly double, or an increase of one hundred per cent. In the former test where no coil or secondary was used upon the diverter, the torque was solely dependent upon the sum of the two repulsive forces exerted between the field of the inducing or series coils and the exterior armature induced poles; while in the latter test the torque acting upon the shaft was equal to the sum of the two repulsions just mentioned plus the two attractive forces taking place between the poles of the diverter and the interior induced poles of the armature. In addition to perceptibly increasing the efficiency of the meter by using these closed coils or circuits upon the diverters, I also reduce to quite a degree the counter electromotive force or back pressure set up in the fields of the meter, by having these closed coils reverse the magnetism of the diverter in opposition to that set up therein by the field coils themselves, thereby reducing their inductance. This is of considerable commercial importance, since it is a common evil with a majority of all electric meters that they decrease the brilliancy of the lights as the number turned on is increased. From a number of tests made I find that the so called "choke" is reduced exactly one-half when a closed circuited diverter is used, at the same time doubling the torque. The torque acting upon the shaft is retarded by the fans 15 which are virtually a load varying as the square of the speed. Since the torque varies as the square of the current, and the power as the cube thereof, the following test will show how closely my improved meter follows an ideal line or square law.

| Ampères. | Revolutions per minute. | Initial speed. | Per cent. error. |
|---|---|---|---|
| 1 | 10.35 | 10.35 | −13.75. |
| 2 | 24.00 | 12.00 | 0. |
| 3 | 36.50 | 12.16 | +1.3 |
| 4 | 48.25 | 12.06 | +0.5 |
| 5 | 60.00 | 12.00 | 0. |
| 6 | 72.00 | 12.00 | 0 |
| 7 | 84.00 | 12.00 | 0 |
| 8 | 96.00 | 12.00 | 0 |
| 9 | 108.00 | 12.00 | 0 |
| 10 | 120.00 | 12.00 | 0 |
| 11 | 132.00 | 12.00 | 0 |
| 12 | 144.00 | 12.00 | 0 |
| 13 | 156.00 | 12.00 | 0 |
| 14 | 168.00 | 12.00 | 0 |
| 15 | 180.00 | 12.00 | 0 |
| 16 | 192.00 | 12.00 | 0 |
| 17 | 204.00 | 12.00 | 0. |
| 18 | 216.00 | 12.00 | 0. |
| 19 | 288.00 | 12.00 | 0. |
| 20 | 240.00 | 12.00 | 0. |
| 21 | 252.12 | 12.01 | 0. |
| 22 | 264.00 | 12.00 | 0. |
| 23 | 276.24 | 12.02 | 0. |
| 24 | 288.00 | 12.00 | 0. |
| 25 | 300.00 | 12.00 | 0. |

The meter attains its maximum speed when the axial plane of the diverter is forty five degrees from that of the field coils 25, and rotation ceases when the two planes are either parallel or at right angles to each other.

The following equation is designed to show the action of my improved meter:

Let T = the torque exerter on the meter shaft.
R = the retardation (due to the fans).
C = the current flowing in series fields.
S = the speed of the meter.
F = the friction of the bearings.
B $B_1$ $B_{11}$ &c. = numerics.

Obviously:

$$T \propto C^2 -$$
$$R \propto S + F$$
$$T = B\ C^2$$
$$R = B_{11}\ S^2 + F$$

At some one point the relation between the torque and retardation due to the fans may be represented by $$T = B\ R$$

or $$B_1\ C^2 = B_{11}\ (B_{11}\ S^2 + F)$$
$$S = \sqrt{\frac{B_1\ C^2 - B_{111}\ F}{B\ B_{11}}}$$

But $B_1$ and $B_{11}$ are constant throughout the curve, and consequently, $\frac{B_1}{B_{11} B_{111}}$ — represents a numeric for the selected point, and the square root of this factor may be represented by B. Therefore, neglecting the effect of friction, which is so small that it introduces no sensible error at the speed greater than that corresponding to a very small load, we may write $S = B\ C$. This equation is true for the selected point and is the equation of a straight line passing through the origin. Therefore the meter curve is a straight line except for the lower currents, where the element of friction is sufficient to cause it to deviate, the meter being a little slow on one lamp.

In Fig. 7 is shown the two current curves $f$ and $c$ of the series field coils and the armature respectively. The upper part of the curves have a positive sign and the lower a negative. The interval of time which these two currents or curves are on the same side of the zero line is very small and marked A, where a mutual attraction takes place. This attraction will be insignificant as compared with the moment of repulsion R, as shown by the curves when they are upon opposite sides of the zero line. Therefore, the sum of the periodic repulsions predominate over the attractions between the two currents and as a result the armature is repelled or blown around upon its axis. It is also to be noted that the less the difference in phase between these two currents the more efficient will be the apparatus and the stronger the torque.

Fig. 8 shows the currents induced in the armature and diverter circuits respectively. The current wave $d$ of the diverter lags a little behind the current wave C of the armature and causes a slight repulsion between them and shown at R when they are upon opposite sides of the zero line, but, since the intervals of attraction A are much in excess of R a strong attraction ensues at each alternation of the current between the poles of the diverter and the interior poles of the armature. Here also will a reduction in phase between these two last curves tend to increase their attraction.

Fig. 9 shows a diverter wound with fine wire and closed upon itself at 58. Fig. 10 shows the same wound with heavier wire. Fig. 11 has three closed copper bands 55 placed upon each pole piece. Fig. 12 shows one coil on each pole made by winding brush copper firmly around it until the requisite cross section is obtained. Fig. 13 is wound with wire and has a variable resistance in series therewith for the purpose of varying the torque or speed when standardizing the meter.

Fig. 14 shows a diverter also wound with wire and having an adjustable inductive circuit in series therewith for regulating the speed when calibrating it.

The diverter Fig. 15 shows one made from a bundle of iron wires, and having a piece of copper tubing slipped over each pole piece.

In Figs. 16, 17, 18, 19, and 20 are shown different ways of constructing the diverter core. The ends may be even as in Figs. 16 and 18 or they may be arranged or stacked with alternately projecting pieces, as shown in Fig. 17, or punched as is shown in Fig. 19, which will prevent the development of surface currents upon the face of the pole pieces of the diverter.

Fig. 20 is a good form and gives excellent results by having its poles curved toward the inducing coils which they approach. I have also in building these diverters, interposed pieces of tissue paper, and have also used strips of diamagnetic metal such as zinc, copper, &c., to prevent any distortion of the lines of force, or leakage taking place from the diverter.

Figs. 21, 22, 23, and 24 show various ways of making the armature to insure lightness and consequent freedom from excessive friction and inertia, while armatures constructed without these holes or slots give excellent results.

I have used silver, copper and aluminum, but I find the last mentioned of these to be the best, and therefore preferably use it in my improvement.

Since the conductivity of aluminum is about double that of copper weight for weight, the advantage gained in using aluminum is very marked.

I also find, since the superficial area of an aluminum cylinder or armature is greater than one made from copper having the same weight, that the radiating surface is also greater and prevents the induced currents from causing any perceptible heating in said armature, thereby tending to keep its resistance constant.

Fig. 25 shows the method of connecting the meter into the work circuit and measuring the current supplied to the lamp 66 from the transformers 64.

In Fig. 26 the meter is provided with a shunt winding 67 and placed around the series coils 25, and having a non-inductive resistance 59 in series therewith. There is also placed in shunt to this fine wire winding 67 a condenser 65 which prevents the magnetism of the series coils 25 from setting up a transformer action in said fine wire or shunt coil and reducing its torque producing properties by setting up a field in opposition to that of the series coils. This condenser, therefore, eliminates the element of self induction and allows a constant current to flow through the shunt coil, and varying with the electromotive force at its terminals. The object of using this shunt coil is for the purpose of overcoming the friction and inertia of the moving parts. Other meters using this shunt or auxiliary field are deficient on account of the transformer action before mentioned, and they have a tendency to cause the speed of the meter to drop as the amount of current through the series fields increases, thereby causing the indications of the registering train to be incorrect. The use of the condenser eliminates this trouble altogether, so that the meter becomes a true recorder of the actual amount of current passed in any given time. I have also used this condenser in series in the shunt circuit with favorable results.

Fig. 27 shows a meter placed in the main primary circuit for measuring the total energy given out at the central station. The coils 25 are connected into the mains leading from the dynamo 64 on the left hand side. The diverter coil 68 is excited by a small transformer and having a non-inductive resistance 59 in series therewith. I also use a condenser in connection with this to prevent the development of a counter electromotive force in said diverter coil 68.

I desire it to be understood that the herein described improvements are also applicable to my multiphase meters and motors described in the patents and applications above referred to.

Having described my improvements and methods of producing a cheap and accurate meter, which is absolutely dust and insect proof and having the highest efficiency, with a means of preventing choke in the lamp or series circuit and the shunt or multiple arc winding when such is used either in combination with the series coils or the diverter, what I claim as my invention, and desire to secure by Letters Patent, is—

1. In an electric meter for alternating currents, the combination of the series or inducing field coils, the aluminum armature or closed revoluble secondary, and an adjustable diverter for determining the speed and direction of rotation of said armature, substantially as described.

2. In an electric meter for alternating currents the combination of the series or inducing coils, the aluminum revoluble secondary armature, and an adjustable diverter having short-circuited coils or hoops placed upon its poles, for the purpose set forth and described.

3. In an electric meter for measuring alternating, pulsating, or intermittent currents, the combination of the series or primary inducing field coils located in the circuit or circuits of the system of supply, the aluminum cylinder or closed revoluble secondary circuit, and a diverter having closed punchings of copper clipped on over its poles with air spaces or insulating material interposed for the purpose set forth and described.

4. In an electric meter for measuring alternating, pulsating or intermittent currents, the series or primary inducing field coils connected in the circuit or circuits of the system of supply, and a diverter adjustable coaxially with the axis of rotation, in combination with a closed revoluble secondary having holes or slots provided therein, as shown, all substantially as described.

5. In an electric meter for single and multiphase alternating currents, the combination of the series or primary inducing coils connected in the circuit or circuits of the system of supply, the aluminum cylinder, armature or revoluble closed secondary circuit, the adjustable diverter for varying the speed and torque, and the dust proof binding posts or terminals with which connection is made with the outer leads or mains of the system and the field coils energizing the armature.

6. In an electric meter for single and multiphase alternating currents, the combination of the series or primary inducing field coils connected in the main circuit or circuits of the system of supply, an aluminum cylindrical armature or revoluble closed secondary circuit, a diverter for causing the magnetic flux produced by the inducing coils to cut through or encounter the revoluble armature or closed secondary obliquely, and a dust proof meter base as herein set forth and described.

7. In an electric meter for alternating currents, the series or primary inducing field coils connected in the circuit or circuits of the system and carrying the current or currents to be measured or used, an aluminum cylindrical armature or closed secondary capable of rotation within and repelled by said series or primary inducing field coils, a diverter composed of a laminæ of iron or steel and having closed circuits, loops, rings or washers made from good conducting metal placed thereon for increasing the rotative power of the meter as described, in combination with the clamping arrangement for securing the armature in transit and consisting of the pointed screws facing upon diametric sides of said armature and fitting into counter-sunk holes in said cylinder provided for said purpose, all substantially as described.

8. In an electric meter for alternating currents, the series or primary inducing field coils connected in the circuit or circuits of the system of supply, the diverter, the aluminum revoluble secondary closed upon itself in the form of a cylinder and repelled from the said primaries and attracted by the said diverter, which is also adjustable coaxially therewith as described, in combination with a registering train for integrating the amount of current or energy consumed or passed through the meter in any given time, the dust proof binding posts closed at the top of the hole 47 into which the wire from the supply circuit enters, for the purpose specified, and 9. In an electric meter for alternating currents, the combination of the primary inducing coils or field connected in series or multiple series in the circuit of the system of supply, the aluminum armature or closed cylindrical secondary revolving upon the spindle 26, between and within the field produced by said primary inducing coils, a diverter coaxial with said revoluble secondary and having short circuited washers or coils placed thereon for the purpose described, the registering train for taking up or recording the number of revolutions made by the secondary, and the aluminum retarding fans also carried upon the spindle for regulating or determining the resulting speed of the armature, so that the indications of the meter will be a true registration of the total amount of current or electrical energy flowing or passed through it in a given time, substantially as set forth and described.

10. In an electric meter for alternating currents, the combination with a dust and insect proof base and binding posts or terminals, the series field coils connected in the work circuit, the aluminum revoluble secondary, the diverter for varying the speed and direction of rotation of said revoluble secondary, the registering train, the retarding fans, the vertical supports separating the field coils and carrying the set-screws provided for clamping or holding the armature rigidly in position during transit, and the lever arm 37 for adjusting the position of the diverter within said revoluble secondary, all substantially as described.

11. In an electric meter for alternating, pulsating, or intermittent currents, the combination of the series field coils located in the supply system, an aluminum revoluble secondary repelled by said series coils, a diverter as and for the purpose described, a condenser connected to the shunt coil or circuit, as shown, and the shunt circuit or circuits possessing self induction, for the purpose specified, all as set forth and described.

12. In an electric meter for alternating currents, the series or inducing field coils connected in the supply circuit or circuits, the revoluble aluminum armature, the diverter for determining the torque of said armature, the combination with the removable jewel post 18 and adjustable within the boss 16 upon the base 13 through which it also passes and the jam or check nut 17, as and for the purpose set forth.

13 In an electric meter for alternating currents, the combination of the primary inducing or series field coils connected in the circuit of the supply system, the revoluble closed cylindrical armature, the diverter, the retarding fans, the registering train, the set screws for holding said armature, the upright supports carrying said set screws, the condenser, connected to the shunt coil or circuit the shunt circuit or circuits possessing self induction, the adjustable and removable jewel post, the dust proof base having the groove 11 at the bottom of which is laid felt 12 or other material, the dust, insect and moisture proof terminals or binding posts which connect said field coils with the supply circuit, and the clamping plate 27 which is screwed in place to the plate 8 by means of the screws 28 and insulated therefrom with the bushings 29, all substantially as described.

Signed by me, at Fort Wayne, Indiana, this 12th day of March, A. D. 1894.

THOMAS DUNCAN.

Witnesses:
WALTER G. BURNS,
F. J. YOUNG.